April 10, 1934.  A. DE W. ELLER  1,954,379

POWER CONTROL

Filed Dec. 24, 1929

INVENTOR
Albert DeWitt Eller
BY
Robert Inslee Hulsizer
ATTORNEY

Patented Apr. 10, 1934

1,954,379

UNITED STATES PATENT OFFICE 1,954,379

POWER CONTROL

Albert De Witt Eller, Divine Corners, N. Y.

Application December 24, 1929, Serial No. 416,231

7 Claims. (Cl. 121—41)

This invention relates to a hydraulic controlling device in which hydrostatic pressure constitutes the medium for energizing the piston.

The object of this invention is to produce a piston movement in either direction proportionate to and approximately the same distance as that in which the controlled medium is moved and to lock itself in that position by closing both inlet and outlet valves. This invention has many uses and is especially adapted for steering motor vehicles, for use as a power brake in connection with motor vehicles, and controlling the position of a ship's rudder.

The preferred form of the invention is shown in the drawing of which:

Referring to the accompanying drawing "A" is a cylinder having one or more inlet openings connected with a recess or recesses for the entrance of fluid and also one or more openings connecting with a recess or recesses for the exit of fluid, openings for piston rod and control medium and suitable stuffing boxes for these openings.

"B" represents one entrance through which fluid enters the cylinder. J represents a recess in cylinder casing leading to exhaust opening K and corresponding opening in sleeve C. H is a recess in cylinder casing leading to ports "N". C is a sleeve having ports N and recess D leading to outlet K. E is a valve rod or control medium attached to sleeve C and transmits energy to the sleeve with which it is attached to control the movements of sleeves C and G and may be attached to either sleeve and enter cylinder through either end. N are ports in sleeve C communicating with ports O in sleeve G and also to recess D. G is a sleeve having ports O. I is a piston connected to piston rod M. P is a lever attached to sleeves C and G at attachment points F and F' using some part of either piston I or piston rod M as a fulcrum. N and O are ports in sleeves G and C which may be respectively disposed in alignment with connected passages J, H, B, and K for the purpose of controlling the movement of the fluids. R are stops in sleeve C and Q are stops in sleeve G.

Figure 1:
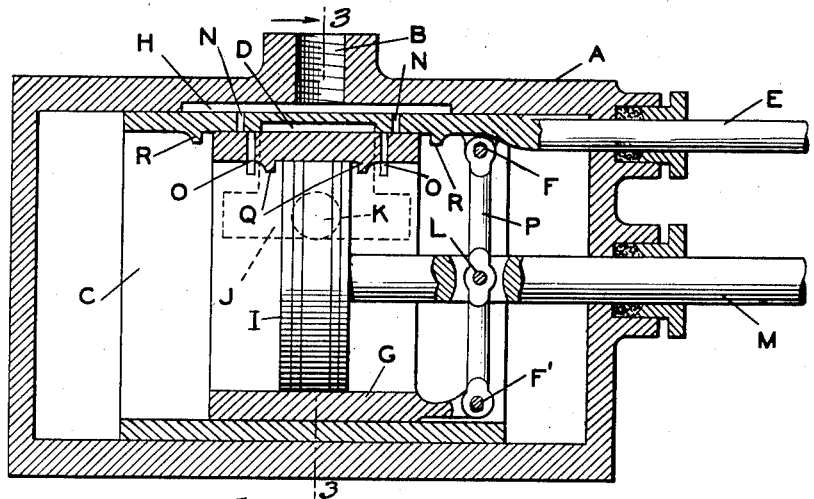
Fig. 1 is a longitudinal vertical sectional view through the device with the parts in a neutral position.
Figure 2:
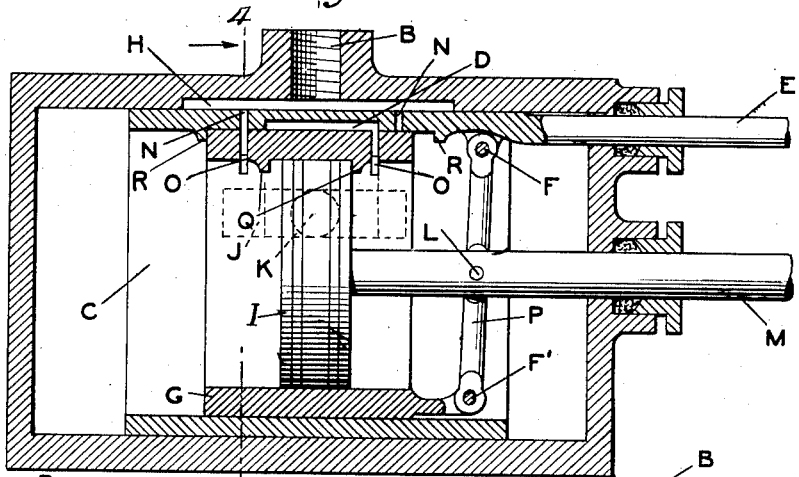
Fig. 2 is a similar view showing the parts in a position with some of the ports aligned.
Figure 4:
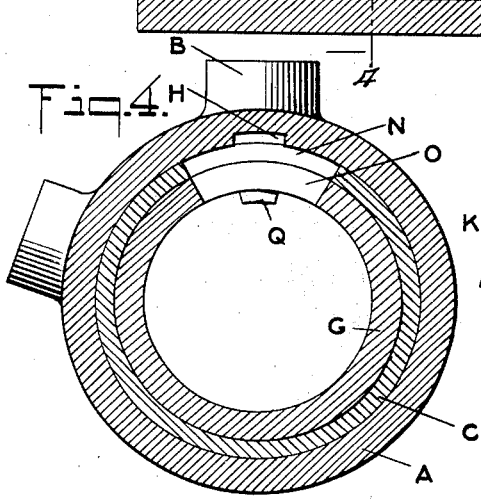
Fig. 4 is a cross section taken on the line 4—4 of Fig. 2.
Figure 3:
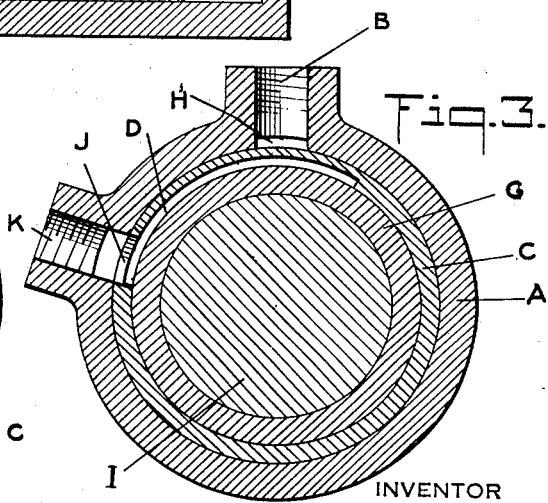
Fig. 3 is a cross section taken through the center of Fig. 1.

In the operation of the device the parts are normally in the position shown in Fig. 1, the rod E is connected by any suitable mechanism not shown to a manually operable device such as the steering wheel of an automobile or boat. When it is desired to change the direction of movement of the vehicle, this manually operable device is moved slightly in one direction or the other. Assuming that the movement is such as to move the sleeve C to the right a short distance, as soon as this sleeve starts to move to the right the inner sleeve G through the intermediary of the lever P fulcrumed on the opposite rod M and pivotally connected to the sleeves C and G, will move in the opposite direction, so that the ports N and O, as shown in Fig. 2, will be quickly aligned.

This movement will preferably bring the left face of the sleeve G in contact with the left-hand stops R and will bring the right face of the piston I in contact with the right-hand stops Q on the inner face of sleeve G. In this position of the sleeves fluid pressure will be admitted to the cylinder through ports B, H, N and O and the other side of the piston will be connected through the right-hand ports O to the exhaust passages D, J and K. This will create an unbalanced pressure on the opposite sides of the piston I which will move it to the right. As the piston moves to the right it will move the sleeve G also to the right by reason of its contact with the right-hand stops Q. As soon as the sleeve G is moved a short distance the ports O will be disconnected both from the supply and the exhaust passages and consequently the sleeve G will then assume the neutral position shown in Fig. 1. At this instant the pressure on both sides of the piston will be equal and further movement of the piston will not occur. As the piston tends to move, the movement of the sleeve G to the right in addition to the action of the piston and the stops Q, will also occur by reason of the connection of lever P, because in this instance the upper attachment point F' of the lever will act as a fulcrum with the force applied to the pivotal point of the lever where it connects with the piston rod M. The other end of the lever P connected at F' tends to be moved, to move the sleeve G to the right. It will thus be seen that this action and movement can take place without the stops R and Q but these stops are preferably employed so that limits of the movement of the sleeves and the pistons may be set and determined.

If further movement of the piston rod M to the right is desired, sufficient movement of the sleeve C to the right is effected through the rod E. This movement to the right or to the left may be continuous or intermittent, as desired. If the sleeve C is moved to the left the operation is exactly the same except that the function and operation of the ports are reversed.

Since the fluid employed in the cylinder is preferably an incompressible one, it is important that the cross sectional area at both ends of the sleeves G and C be the same, so that they can be initially moved in the opposite directions. To this end the thickness of the sleeve C, which is of larger dimension, is made less proportionally than the sleeve G, which is of smaller dimension, consequently when one moves to the right and the other to the left they displace equal amounts of the incompressible fluid and their movement thereby can take place.

It will, therefore, be observed that the invention comprises a very simple, compact, rugged construction comprising a cylinder with suitable inlet and exhaust ports within which two sliding sleeves are disposed, one connected to a manually operated device, and the other connected to a device to be directed or moved. These sleeves are provided with ports capable of being aligned and disaligned to connect, or disconnect them from the inlet and exhaust ports, suitable stops are provided to limit the motion of the sleeves with respect to each other and to limit the motion of the piston with respect to one of the sleeves. Furthermore the sleeves are connected by a single simple pivoted lever so that when one sleeve moves in one direction the other will move in the opposite direction. The face of this lever being in pivotal relation to the piston rod unit, so that as the piston itself is moved with the one sleeve, the movement of the piston will restore the other sleeve to normal position and stop the further movement of the driven or directed device until the sleeve actuated by the manual control is further operated.

I claim:

1. In a power control device, a cylinder, a pair of nested sleeves disposed within the cylinder, a piston disposed for sliding movement within the inner sleeve, a piston rod, means connected to one of said sleeves for manually moving the same, a lever with its ends connected respectively to the sleeves, and pivotally connected to the piston at an intermediate point, said sleeves and cylinder having a plurality of associated ports for the exhaust and admission of fluid in the cylinder.

2. In a power control device, a cylinder, a pair of nested sleeves disposed within the cylinder, a piston disposed for sliding movement within the inner sleeve, a piston rod, means connected to one of said sleeves for manually moving the same, a lever with its ends connected respectively to the sleeves, said lever pivotally connected to the piston at an intermediate point, said sleeves and cylinder having a plurality of associated ports for the exhaust and admission of fluid in the cylinder, and stop members on the outer sleeve adapted to limit the motion of the inner sleeve with respect thereto.

3. In a power control device, a cylinder, a pair of nested sleeves disposed within the cylinder, a piston disposed for sliding movement within the inner sleeve, a piston rod, means connected to one of said sleeves for manually moving the same, a lever with its ends connected respectively to the sleeves, said lever pivotally connected to the piston at an intermediate point, said sleeves and cylinder having a plurality of associated ports for the exhaust and admission of fluid in the cylinder, stop members on the outer sleeve adapted to limit the motion of the inner sleeve with respect thereto, and stop members on the inner sleeve adapted to limit the movement of the piston with respect to the inner sleeve.

4. In a power control device, a cylinder, a pair of nested sleeves therein, a piston disposed within the nested sleeves, means for manually moving one of said sleeves, and means associated between the sleeves and the piston to give opposite motion of one sleeve when the other sleeve is moved in a given direction.

5. In a power control device, a cylinder, a pair of nested sleeves therein, a piston disposed within the nested sleeves, means for manually moving one of said sleeves, means associated between the sleeves and the piston to give opposite motion of one sleeve when the other sleeve is moved in a given direction, and means associated between the sleeves and between one sleeve and the piston to limit the relative motion between the sleeves and between one sleeve and the piston.

6. In a power control device, a cylinder, a sleeve therein having spaced inlet ports and an outlet passage therebetween, a second sleeve disposed slidably within the first sleeve, said second sleeve having ports disposed between the respective inlet ports and the outlet passage on the first sleeve when the sleeves are disposed in a neutral position, a pivoted lever connected at its ends to the respective sleeves, a piston disposed within the inner sleeve, a piston rod thereon, said lever connected at an intermediate point pivotally to the piston rod, means for moving one of said sleeves manually, one of said sleeves adapted to move in one direction when the other sleeve moves in the opposite direction.

7. In a power control device, a cylinder, a sleeve therein having spaced inlet ports and an outlet passage therebetween, a second sleeve disposed slidably within the first sleeve, said second sleeve having ports disposed between the respective inlet ports and the outlet passage on the first sleeve when the sleeves are disposed in a neutral position, a pivoted lever connected at its ends to the respective sleeves, a piston disposed within the inner sleeve, a piston rod thereon, said lever connected at an intermediate point pivotally to the piston rod, means for moving one of said sleeves manually, one of said sleeves adapted to move in one direction when the other sleeve moves in the opposite direction, and stop means disposed between the sleeves and between one sleeve and the piston to limit the relative motion between the sleeves and between the inner sleeve and the piston.

ALBERT DE WITT ELLER.